United States Patent [19]

Iwata et al.

[11] 4,362,370

[45] Dec. 7, 1982

[54] AUTOMATIC FILM TRANSPORT DEVICE

[75] Inventors: Hiroshi Iwata, Nara; Tsunemi Yoshino, Ibaraki, both of Japan

[73] Assignee: West Electric Co., Ltd., Osaka, Japan

[21] Appl. No.: 235,750

[22] Filed: Feb. 18, 1981

[30] Foreign Application Priority Data

Feb. 26, 1980 [JP] Japan .................................. 55-23652
Feb. 26, 1980 [JP] Japan .................................. 55-23653

[51] Int. Cl.³ .................... G03B 1/04; G03B 17/36; B65H 25/32
[52] U.S. Cl. ................................ 354/173; 354/213; 354/217; 242/188; 242/201; 226/33
[58] Field of Search ............... 354/171, 173, 204–206, 354/213–215, 217, 218; 352/121, 124, 137, 169; 242/71.4, 71.5, 71.6, 186–188, 190, 201; 226/24, 27, 28, 33

[56] References Cited
U.S. PATENT DOCUMENTS 4,251,148 2/1981 Stemme et al. ................... 354/173

FOREIGN PATENT DOCUMENTS 2847791 5/1979 Fed. Rep. of Germany ...... 354/173

Primary Examiner—Donald A. Griffin
Assistant Examiner—William B. Perkey
Attorney, Agent, or Firm—Burgess, Ryan and Wayne

[57] ABSTRACT

An automatic film transport device for use in cameras has a first function of (i) automatically completely unrolling an unexposed film from a film case or magazine and winding it on a take-up reel or spool and a second function of (ii) automatically rewinding the film into the film case or magazine by a predetermined length (corresponding to the width of one frame) each time one exposure has been completed. Therefore, even when one erratically opens the camera back when the film is still loaded in the camera, the exposed frames have been already rewound into the light-shielded film case or magazine, so that they may be prevented from being ruined or reexposed. In addition to the first and second functions as described above, the automatic film transport device may be provided with a function or capability of counting and displaying the number of all exposable frames on the film wound on the take-up reel or spool or the remaining number of exposable frames.

8 Claims, 8 Drawing Figures

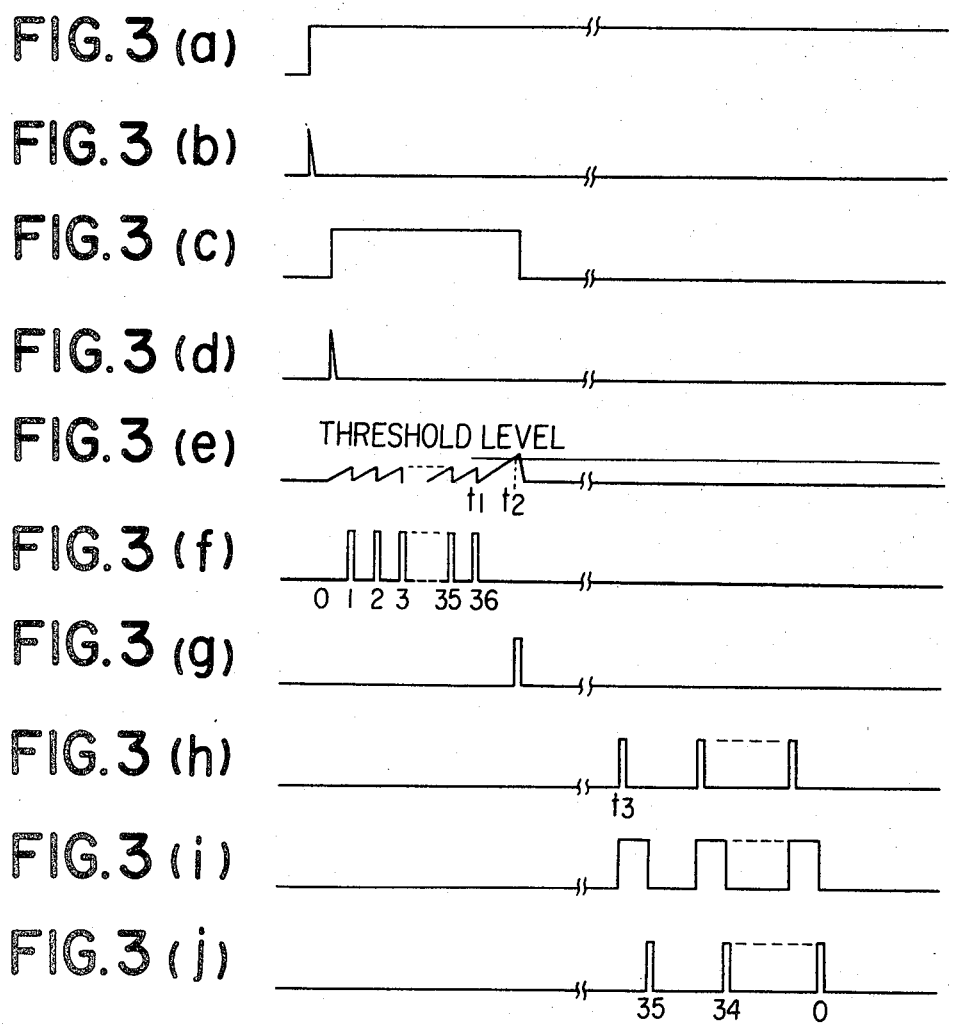

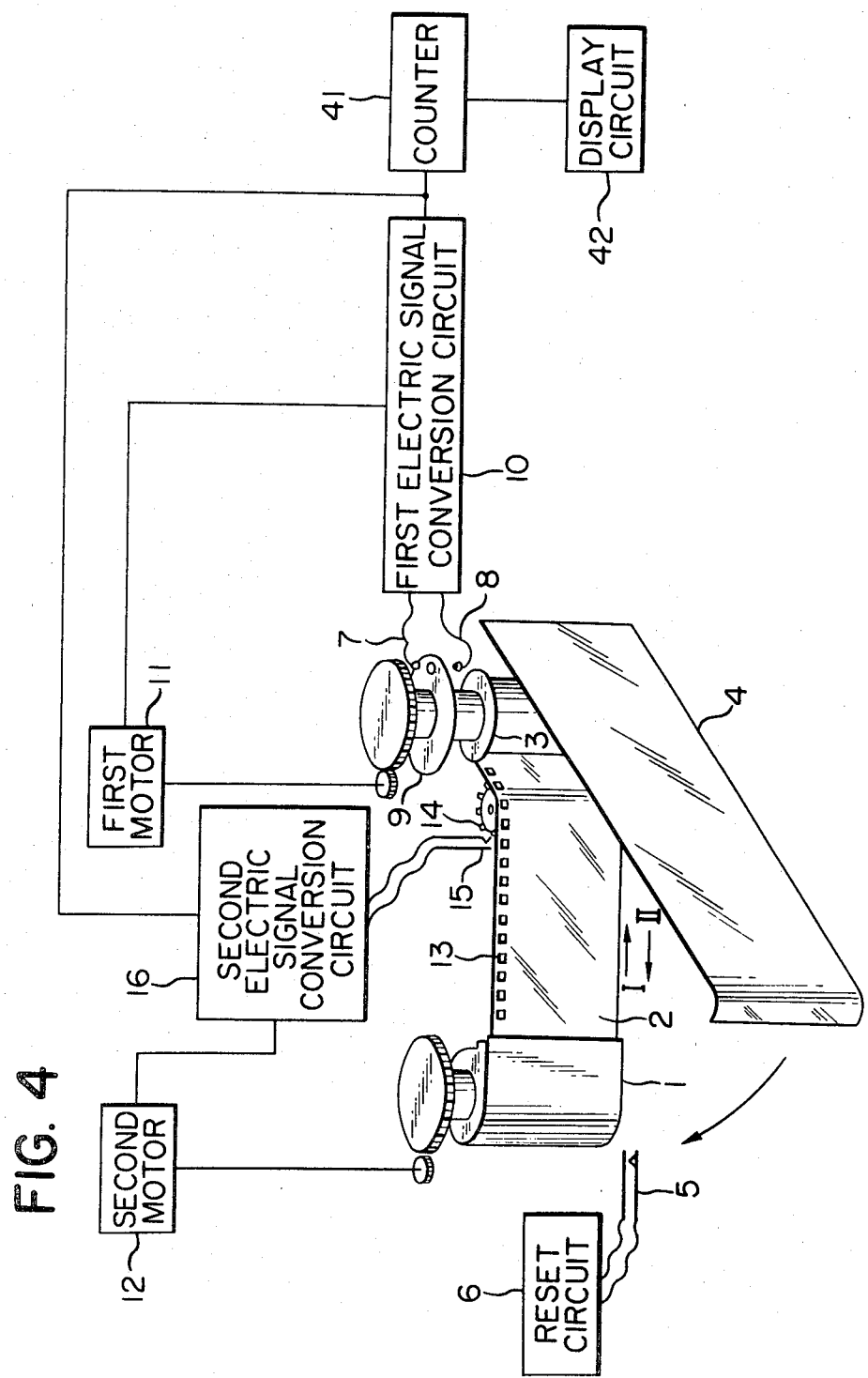

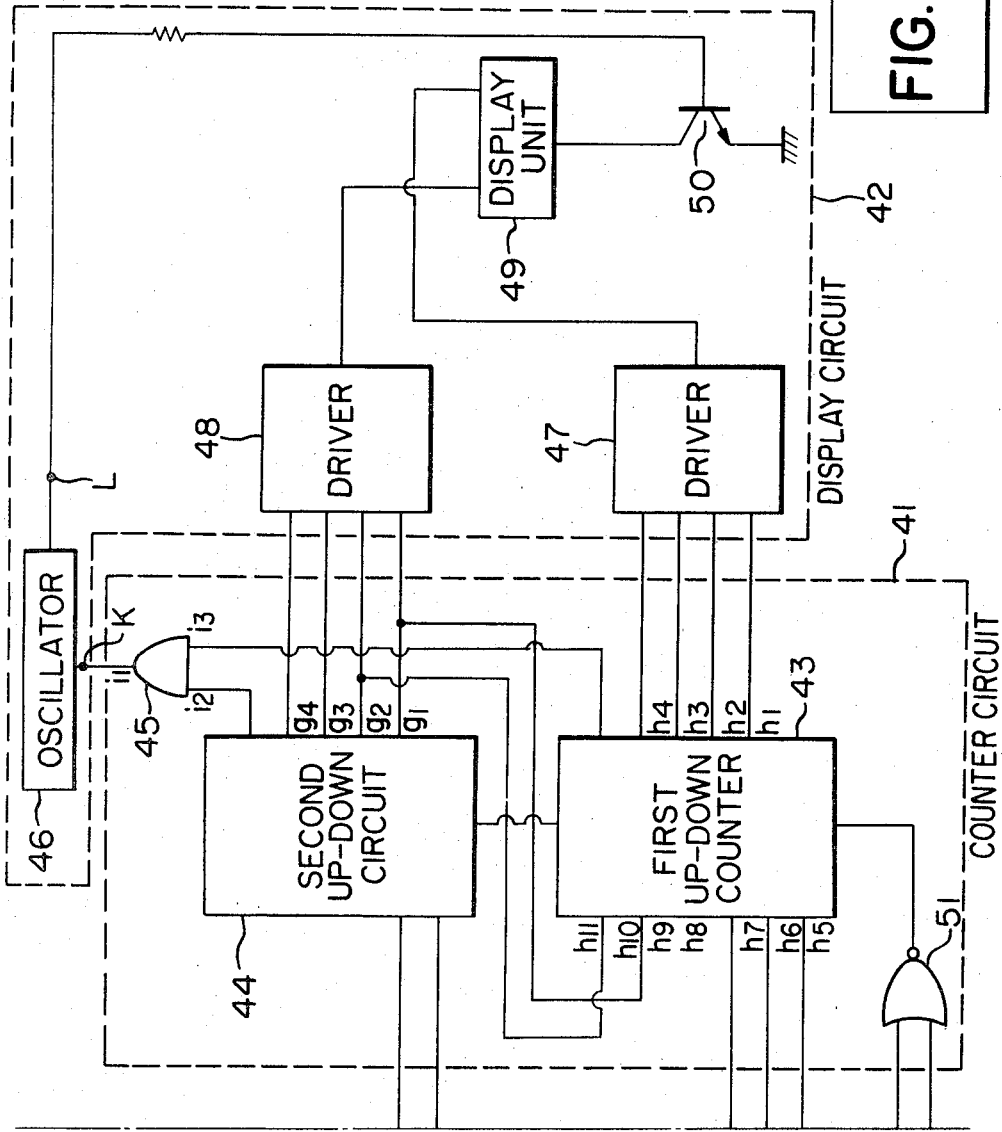

THRESHOLD LEVEL 0 1 2 3   35 36 t1  t2 t3 t3

25   34   0 t1 t2   t3

AUTOMATIC FILM TRANSPORT DEVICE

BACKGROUND OF THE INVENTION

The present invention relates to a camera and more particularly an automatic film transport device therefor.

In general with the prior art 35-mm cameras, everytime when one exposure has been completed, an unexposed film is drawn out of a film case or magazine and taken up on a take-up reel by a predetermined length. Therefore, when one erratically opens a film door or a camera back before the exposed film has been rewound into the film case or magazine, all the exposed frames are reexposed and fatally ruined.

Meanwhile, the conventional cameras with both manual and motor-driven film winding and rewinding systems have a frame counter which indicates the number of frames that have been already exposed. Furthermore, 35-mm films with 12, 24 and 36 exposures or frames are on the market. As a result, in order to confirm how many frames are still available for exposure, one must count by subtracting from 12, 24 or 36 the number indicated by the frame counter. It follows, therefore, that preferably a frame counter can automatically indicate or display the remaining number of unexposable frames regardless of the films with 12, 24 or 36 exposures or frames. However, such a frame counter or a display unit has not been available so far.

SUMMARY OF THE INVENTION

In view of the above, a first object of the present invention is to provide an automatic film transport device which once (i) automatically winds an unexposed film in a film case or magazine on a take-up reel or spool when, for instance, a film door or camera back is closed after the film case or magazine has been loaded and which subsequently (ii) automatically rewinds the film into the film case or magazine by a predetermined length each time one exposure has been completed, so that even when the film door or camera back is accidentally opened, the exposed frames can be prevented from being reexposed and fatally ruined.

A second object of the present invention is to provide an automatic film transport device which is not only capable of winding and rewinding stepwise the film as described above but also capable of automatically detecting the number of exposable frames of the film wound on the take-up reel or spool and displaying the number.

A third object of the present invention is to provide an automatic film transport device of the type described above and still capable of automatically displaying the remaining number of exposable frames by decreasing the displayed number by one each time one exposure has been completed.

The above and other objects, effects and features of the present invention will become more apparent from the following description of preferred embodiments thereof taken in conjunction with the accompanying drawings.

BRIEF DESCRIPTION OF THE DRAWINGS

FIG. 3 shows the waveforms at various points in the circuit diagram shown in FIG. 2;

FIG. 4 is a schematic perspective view of a second embodiment of the present invention;

Same reference numerals are used to designate similar parts throughout the figures.

DESCRIPTION OF THE PREFERRED EMBODIMENTS

Figure 1:
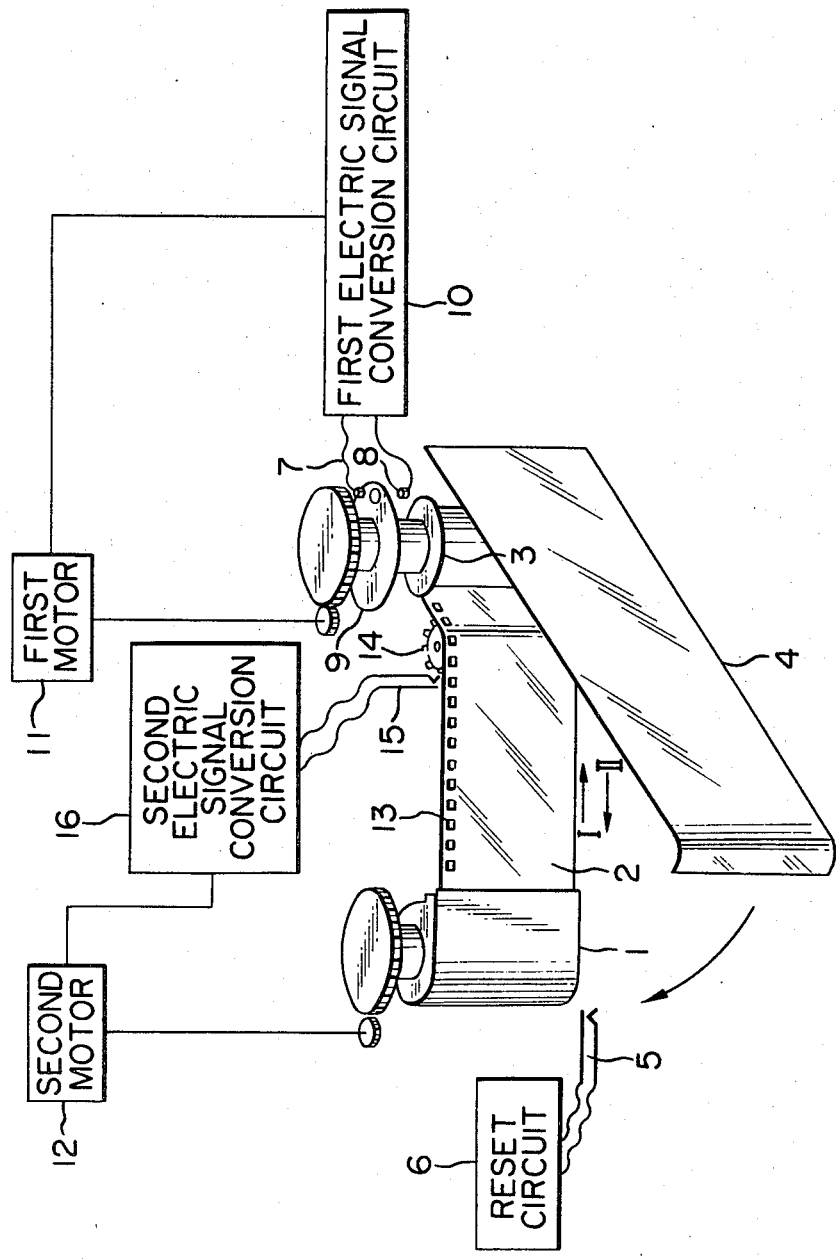
FIG. 1 is a schematic perspective view of a first embodiment of an automatic film transport device in accordance with the present invention.
Figure 2:
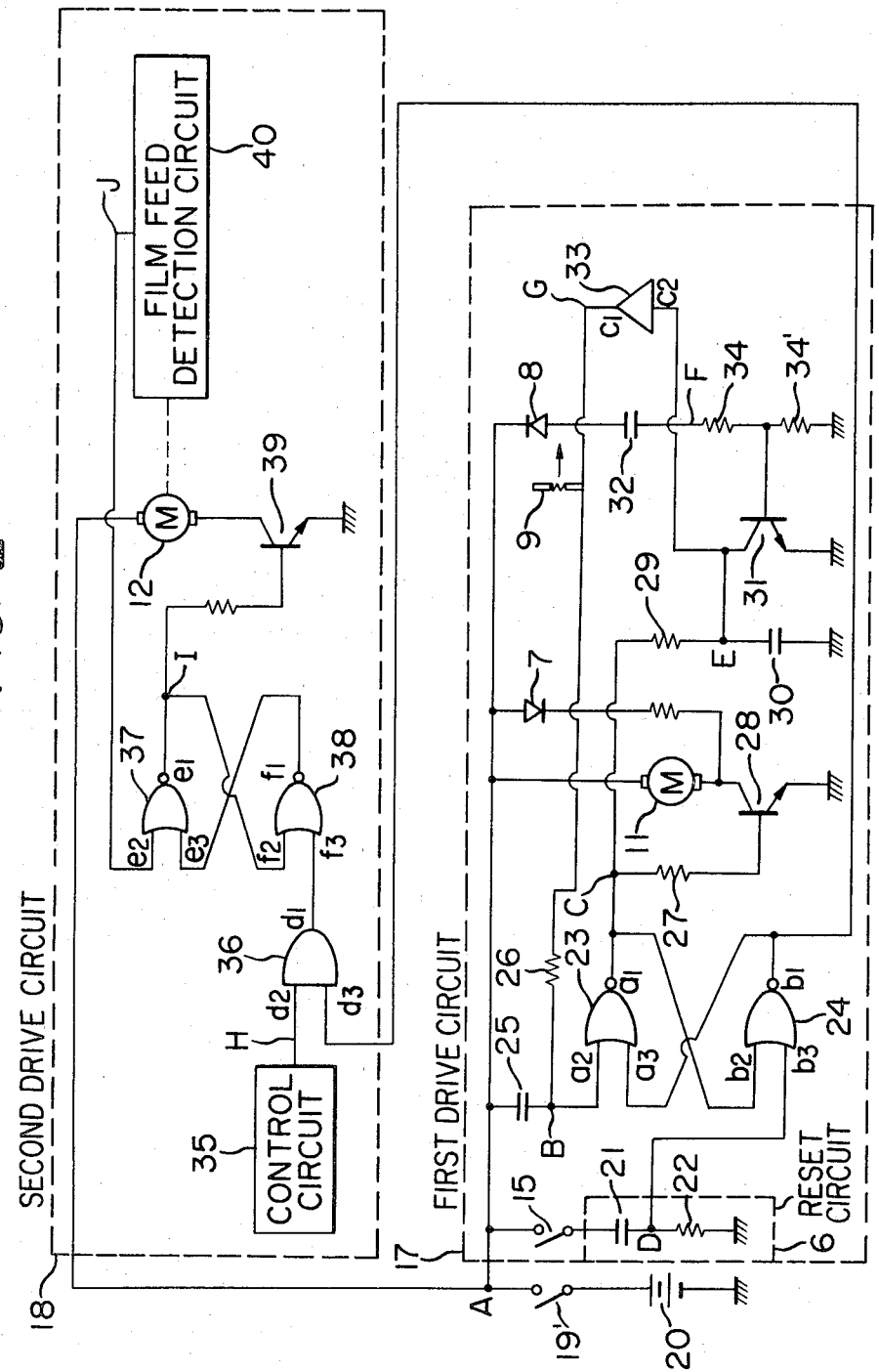
FIG. 2 is a diagram of an electric circuit thereof.

First Embodiment, FIGS. 1 through 3

Referring first to FIG. 1, the leading edge of a film 2 unrolled from a film case or magazine 1 is made into engagement with a groove of a take-up reel or spool 3. When a door or camera back 4 is closed, a first switch 5 is closed so that a reset circuit 6 sets all electric circuits in an initial or winding mode. A first motor 11 is energized, so that the film 2 is advanced in the direction indicated by an arrow I and wound around the take-up reel or spool 3. Concurrently, the winding condition; that is, the winding of the film 2 around the take-up reel or spool 3 is detected by a detecting means comprising a light emitting element 7, a light sensor 8 and a slit disk 9 with a predetermined number of apertures.

When the film 2 has been wound around the take-up reel or spool 3, in response to the output signal from an electric signal conversion circuit 10 which in turn is responsive to the output from the winding detecting means, the first motor 11 is de-energized and all the electric circuits are set to the rewinding mode. After each exposure, a second motor 12 is energized, so that the film 2 is advanced in the direction indicated by an arrow II and is wound in the film case or magazine 1.

As the film 2 is advanced in the direction II, its perforations 13 engage with the teeth of a sprocket wheel 14, so that the sprocket 14 is rotated, turning on and off a second switch 15. The on-off signals from the second switch 15 is transmitted to a second electric signal conversion circuit 16 which in turn controls the rotation of the second motor 12. More particularly, assume that the film 2 is a 35-mm type. Then, when the second electric signal conversion circuit 16 has received the on-off signals corresponding eight perforations 13 of the film corresponding to one picture frame thereof, the second motor 12 is de-energized. In other words, the second motor 12 is energized so as to advance the film 2 a length equal to the width of the picture frame.

Everytime when an exposure is made, the above-described step is repeated. Therefore, even when an operator erratically opens the door or camera back 4 when the film is still loaded in the camera, almost all of the exposed portion of the film 2 has been already wound into the film case or magazine 1 which is optically shielded. Thus, the exposed frames can be avoided from fatal reexposure.

The above is the fundamental underlying principle of the first embodiment in accordance with the present invention. Next, referring to FIGS. 2 and 3, an electric control circuit of the first embodiment will be described in detail. The control circuit comprises a first drive circuit 17 for unrolling the film from the film case or magazine 1 and winding it around the take-up reel or spool 3 and a second drive circuit 18 for unrolling the film 2 from the take-up reel or spool 3 so as to rewind it into the film case or magazine 1 one frame at a time.

A power supply 20 or on-off switch 19 is closed manually or automatically by a suitable means which detects that a film case or magazine is loaded into the camera body. Then, the potential at the point A in FIG. 2 rises as indicated at (a) in FIG. 3. That is, a power supply 20 is connected to the first and second drive circuits 17 and 18, so that they become ready to operate.

First the mode of operation of the first drive circuit 17 will be described. When the on-off switch 19 is closed, the outputs from NOR gates 23 and 24 are set to their initial levels. More particularly, a high level output as shown at (b) in FIG. 3 from a differentiating circuit comprising a capacitor 25 and a resistor 26 is applied to the input terminal $a_2$ of the NOR gate 23, and a low level signal is applied through a resistor 22 to the input terminal $b_3$ of the NOR gate 24. As a result, a low level signal appears at the output terminal $a_1$ of the NOR gate 23 while a high level signal appears at the output terminal $b_1$ of the NOR gate 24. That is, the initial outputs of the NOR gates 23 and 24 are set low and high, respectively.

Thereafter, a film case or magazine 1 is loaded in the camera body and its leading edge is engaged with the groove of the take-up reel or spool 3 as shown in FIG. 1 and the film door or camera back 4 is closed. Then, the first switch 5 is turned on so that a high level output signal, as shown at (d) in FIG. 3, of the reset circuit 6 or a differentiating circuit comprising a capacitor 21 and a resistor 22 appears at the point D and is applied to the input terminal $b_3$ of the NOR gate 24. As a consequence, the outputs from the NOR gates 23 and 24 are reversed; that is, a high level signal appears at the output terminal $a_1$ while a low level signal apears at the output terminal $b_1$. A high level signal at the point C; that is, the high level output signal from the NOR gate 23 as shown at (c) in FIG. 3 is applied through a resistor 27 to the base of a transistor 28, so that the latter is enabled.

When the transistor 28 is turned on, the winding motor or the first motor 11 is energized to rotate the take-up reel or spool 3, thereby winding the film 2. Concurrently, the light emitting element 7 is energized to emit the light which in turn is received by the light sensor 8.

The slit disk 9 which has apertures and is adapted to rotate in unison with the take-up reel or spool 3 is interposed between the light emitting element 7 and the light sensor 8, so that the reception of the light by the light sensor 8 is correlated with the rotation of the take-up reel or spool 3.

The high level output signal from the NOR gate 23 is also applied to a capacitor 30 through a resistor 29, so that the latter is charged. A voltage across the capacitor 30 is applied to a buffer circuit 33 which in turn delivers a low level output signal when the voltage across the capacitor 30 or input voltage is less than a threshold value but a high level signal when the input voltage is higher than the threshold value. In other words, the buffer circuit 33 functions as an analog-to-digital conversion circuit for converting the analog voltage signal across the capacitor 30 into the digital signal as described above. The output signal from the buffer circuit 33 is applied through a resistor 26 to the input terminal $a_2$ of the NOR gate 23.

The mode of charging the capacitor 30 will be described in more detail below. Charging of the capacitor 30 is started concurrently when the first switch 5 is turned on and subsequently the first motor 11 is energized. The potential at the point F; that is, the junction between a capacitor 32 and a resistor 34, which is connected in series to a resistor 34', changes as shown at (f) in FIG. 3 in response to the output from the light sensor 8. As a result, a transistor 31 is turned on and off in accordance with signals at point F as shown at (f) in FIG. 3; that is, the transistor 31 is turned on every time when the light sensor 8 intercepts the light emitted from the light emitting element 7 through the aperture of the slit disk 9. As a consequence, everytime when the transistor 31 is turned on, the capacitor 30 is discharged, so that the potential at the point E changes as shown at (e) in FIG. 3. The rotational speed of the first motor 11 and the charging time constant of the capacitor 30 can be so suitably selected that the voltage across the capacitor 30 will never exceed the threshold value as long as the first motor 11 is being driven. Thus, other circuits can be maintained their states before the first motor 11 has been driven.

The trailing edge of the film 2 is made fast to the film case or magazine 1. Therefore, almost all the length of the film 2 is wound up around the take-up reel or spool 3, a high tension is exerted to the first motor 11. This tension overcomes the torque of the first motor 11, so that the latter is forced to stop. Consequently, both the take-up reel or spool 3 and the slit disk 9 are stopped, so that the potential at the point F remains unchanged or at a low level and subsequently the transistor 31 remains disabled.

Then, no intermittent discharge of the capacitor 30 through the transistor 31 will result, so that the voltage across the capacitor 30 starts to continuously rise from a time $t_1$ as shown at (e) in FIG. 3 and exceeds the threshold value at $t_2$.

The output signal from the buffer circuit 33; that is, the potential at the point G reverses from low to high at $t_2$ as shown at (g) in FIG. 3 and the high level signal is applied through the resistor 26 to the input terminal $a_2$ of the NOR gate 23. Then the output signals at the output terminals $a_1$ and $b_1$ of the NOR gates 23 and 24 are reversed; that is, a low level output signal appears at the output terminal $a_1$ and a high level output signal appears at the output terminal $b_1$. The output signal at the output terminal $a_1$ of the NOR gate 23; that is, the potential at the point C falls to a low level at $t_2$ as shown at (c) in FIG. 3, the transistor 28, which has been in the conduction state, is turned off, so that the first motor 11 and the light emitting element 7 are electrically disconnected from the power supply 20.

The charging of the capacitor 30 is also interrupted because the output from the NOR gate 23 drops low and the capacitor 30 is discharged through the resistor 29 (See the waveform after $t_2$ in FIG. 3(e)). As a result, the output signal from the buffer circuit 33 reverses to a low level. Thus, the first drive circuit 17 is returned to its initial state. The sequence as described above will not be repeated unless the first switch 5 is opened and then closed again so as to discharge the capacitor 21 in the reset circuit 6.

Next, the second drive circuit 18 for rewinding the film 2 will be described. A control circuit 35 controls a sequence of steps associated with the exposure. That is, after completion of each exposure at $t_3$, the control circuit 35 delivers a high level signal as shown at (h) in FIG. 3. A film feed detection circuit 40 includes the sprocket 14 and the second switch 15 (See FIG. 1) for detecting the length of the film 2 advanced or rewound. With a 35-mm film, the film feed detection circuit 40 delivers a high level signal as shown at (j) in FIG. 3 when eight perforations 13 corresponding to one frame have been counted.

The operation of a flip-flop comprising two NOR gates 37 and 38 is timed exactly to that of the flip-flop comprising NOR gates 23 and 24 in the first drive circuit 17. That is, when the on-off switch 19 is closed, a low level outut signal appears at the output terminal $e_1$ of the NOR gate 37 while a high level output signal appears at the output terminal $f_1$ of the NOR gate 38. The output signal from the NOR gate 24 in the first drive circuit 17 is applied to the input terminal $d_3$ of an AND gate 36. It follows, therefore, that when the first drive circuit 17 is operating, the output signal from the NOR gate 24 is at a low level, so that the output signal of the AND gate 36 remains at a low level regardless of the state of the signal applied to the other input terminal $d_2$ thereof. Thus, the flip-flop comprising NOR gates 37 and 38 remains in its initial state, so that the second drive circuit 18 is kept deactivated.

Now, assume that the first drive circuit 17 has completed its operation as described previously so that the output signal at the output terminal $b_1$ of the NOR gate 24 rises to a high level and applied to the input terminal $d_3$ of the AND gate 36. Then, after the completion of each exposure, the control circuit 35 delivers a high level signal to the input terminal $d_2$ of the AND gate 36, so that the output signal at the output terminal $d_1$ rises from low to high. Then, the output signal at the output terminal $e_1$ of the NOR gate 37 reverses to high while the output signal at the output terminal $f_1$ of the NOR gate 38 drops from a high level to a low level.

Now, the output signal at the output terminal $e_1$ of the NOR gate 37; that is, the potential at the point I will be investigated in detail below. As shown at (i) in FIG. 3, the output signal rises to a high level at $t_3$ and is applied through a resistor to the base of a transistor 39, so that the latter is turned on. As a consequence, the current flows from the power supply 20 to the second motor 12, so that the exposed film is rewound into the film case or magazine 1 by one frame. Consequently, the detection circuit 40 starts its operation. That is, when eight perforations of the 35-mm film 2 have been counted through the sprocket 14 and the second switch 15, the output signal of the detection circuit 40; that is, the potential at the point J rises to a high level as shown at (j) in FIG. 3. The high level output signal from the detection circuit 40 is applied to the input terminal $e_2$ of the NOR gate 37, so that the output signals of the NOR gates 37 and 38 are reversed; that is, the output signal at the output terminal $e_1$ of the NOR gate 37 drops low while the output signal at the output terminal $f_1$ of the NOR gate 37 rises high. As a consequence, the output signal at the output terminal $e_1$ of the NOR gate 37; that is, the potential at the point I drops as shown at (i) in FIG. 3. As a result, the transistor 39, which has been in the conduction state, is turned off, so that no current flows into the second motor 12 from the power supply 20 and consequently the second motor 12 is stopped.

After the completion of each exposure, the above-described sequence is repeated, so that the exposed film is rewound into the film case or magazine one frame by one frame.

After the exposed film has been completely rewound into the film case or magazine 1 in the manner described above, one opens the film door or camera back 4 and takes out the film case or magazine 1 out of the camera body. When one loads a new film case or magazine 1 and closes the film door or camera back 4, so that the first switch 5 is again closed, the above-described film winding and rewinding sequences are repeated.

So far the first embodiment of the present invention has been described as having two independent sets of mechanisms for winding and rewinding a film. That is, the film winding is accomplished with the first motor 11 and the film detecting means comprising the light emitting element 7, the light sensor 8 and the slit disk 9 while the stepwise rewinding is accomplished by the second motor 12 and the film feed detection circuit 40, but such rather complex arrangement may be simplified as described below. That is, the first motor 11 is so arranged as to be controlled in response to the output from the film feed detection circuit 40 which controls the second motor 12. Thus, the optical film detection device comprising the light emitting element 7, the light sensor 8 and the disk 9 can be eliminated.

In addition, the first embodiment of the present invention may be somewhat modified as will be described below. In this modification only one motor is used and is drivingly coupled to the gear of the winding spool and to the gear carried by a film rewinding shaft through a train of intermediate gears in such a way that in the case of winding, the motor can be connected only to the winding spool while in the case of rewinding, the motor can be connected only to the rewinding shaft which in turn is connected to a rewinding spool in the film case or magazine 1. In another modification, the motor drive circuit may be so designed and constructed that the polarities of the voltage applied across the motor may be reversed in the case of winding and rewinding so that the motor is driven in one direction in the case of winding and in the other direction in the case of rewinding. Both the modifications have a common advantage that only one motor is needed.

In summary, according to the first embodiment of the present invention, when a film case or magazine is loaded into the camera body, an unexposed film is once wound up automatically on the take-up reel or spool as soon as the camera back is closed and after the completion of each exposure, the film is automatically rewound into the film case or magazine step by step. Thus opposed to the conventional cameras, the exposed film may be avoided from being fatally ruined by reexposure when the camera back is erratically opened.

Figure 5A:
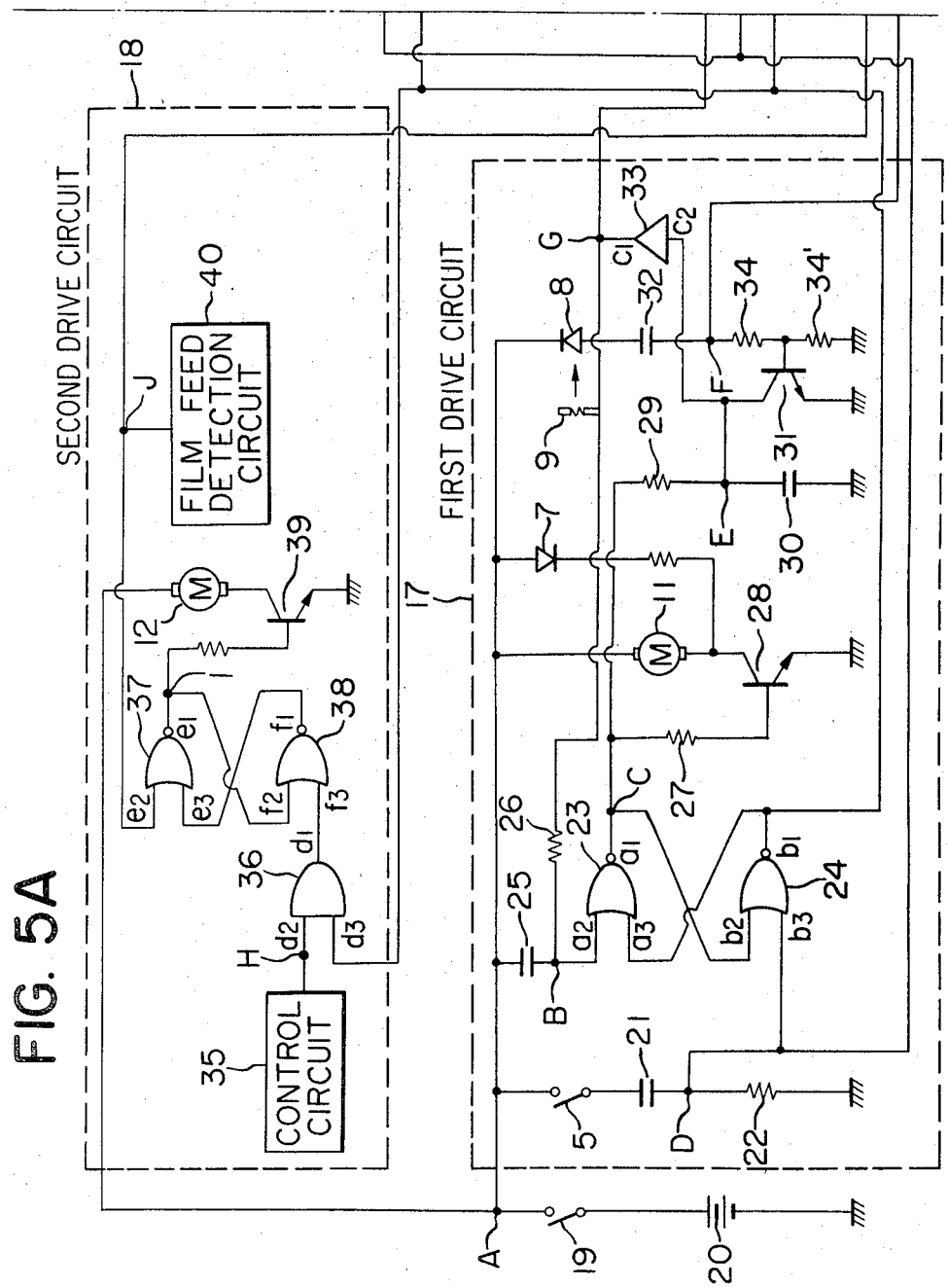
FIG. 5 is a diagram of an electric circuit thereof.
Figure 6A:
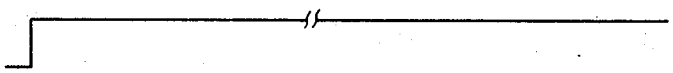
FIG. 6 shows the waveforms of signals at various points in the diagram shown in FIG. 5.
Figure 6B:
Figure 6C:
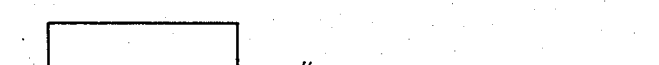
Figure 6D:
Figure 6E:
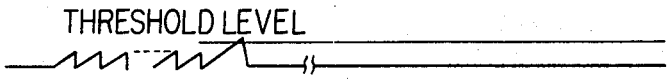
Figure 6F:
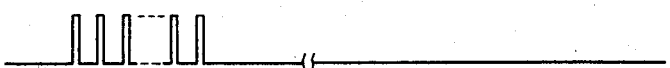
Figure 6G:
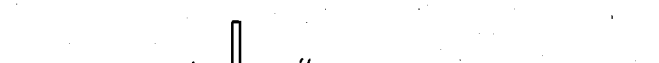
Figure 6H:
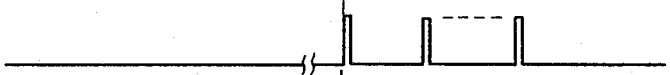
Figure 6I:
Figure 6J:
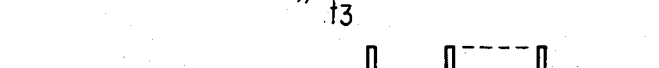
Figure 6K:
Figure 6L:

Second Embodiment, FIGS. 4 through 6

In the second embodiment of the present invention, the signals used in the first embodiment for controlling the first and second motors are used for displaying the number of remaining or unexposed frames by subtracting one from the total number of frames available for exposure of one film everytime when one exposure is made.

Referring to FIG. 4, the second embodiment is substantially similar in construction to the first embodiment shown in FIG. 1 except that a counter 41 and a display circuit 42 are added for displaying the number of remaining unexposed frames. The film 2 is wound once on the take-up reel or spool 3 and then rewound step by step into the film case or magazine 1 in the manner described previously. In the first embodiment, the optical detecting means comprising the light emitting element 7, the light sensor 8 and the slit disk 9 has been described as being adapted to detect the winding condition; that is, the winding of the film on the take-up reel or spool 3, but in the second embodiment, it is also used to detect the length of the film 2 wound on the take-up reel or spool 3; that is, the number of frames. That is, the counter 41 counts the outputs from the first electric signal conversion circuit 10 as will be described in detail below. The length or number of frames of the film 2 wound on the take-up reel or spool 3 can be detected, for example, as a function of diameter of the wound film. However, the wound length or number of frames is not in linear proportion to the increasing diameter. Accordingly, in practice, the points for displaying the numbers of frames of the wound film such as 12, 24 and so on are predetermined corresponding to the numbers of the frames irrespective of the numbers of rotations of the take-up reel or spool 3.

The counter 41 is also connected to the second electric signal conversion circuit 16 so that everytime when the second motor 12 is stopped in response to the signal from the mechanical detecting means comprising the sprocket 14 and the second switch 15 for detecting the length of the film rewound stepwise in the manner described in detail above, the counter 41 decrease one so that the display circuit 42 displays the number of remaining unexposed frames as will be described in detail below. Thus an operator can easily confirm the number of remaining unexposed frames by viewing the display circuit 42. When all the frames are exposed, the display circuit 42 displays "zero", demanding for loading of a new film case or magazine 1.

The above is the underlying principle of the second embodiment of the present invention.

Referring to FIGS. 5 and 6, the electric control circuit of the second embodiment will be described in detail. The first drive circuit 17 for automatically winding the unexposed film 2 on the take-up reel or spool 3 and the second drive circuit 18 for automatically rewinding the exposed film stepwise have been already described in detail with reference to FIGS. 2 and 3 in conjunction with the first embodiment, so that a counter circuit 41 and a display circuit 42 for displaying the number of remaining unexposed frames will be described.

The counter circuit 41 includes up-down or reversible counters 43 and 44. The first up-down counter 43 counts units and the second up-down counter 44 counts tenths. The output terminals $g_1$ and $g_2$ of the second up-down counters 44 are connected to the preset terminals $h_9$ and $h_{10}$, respectively, of the up-down counter 43. In general, the 35-mm films have 12, 24 and 36 exposures for frames. Therefore, when the contents of the counter 44 is 1 after the film has been wound on the take-up reel or spool 3, the contents of the counter 43 is 2 so that the display circuit 42 displays "12". In like manner, when the contents of the counter 44 is 3, the contents of the counter 43 is 6 so that the display circuit 42 displays "36".

The display circuit 42 includes a display unit 49 which comprising light emitting diodes or liquid-crystal display elements and which is driven by drivers 47 and 48. An oscillator 46 is enabled when the contents in both the counters 43 and 44 become zero, so that the display unit 49 is twinkled, thereby indicating that all the frames have been exposed and rewound into the film case or magazine 1.

The on-off switch 19 is closed manually or automatically by means which detects that a film case or magazine 1 has been loaded into the camera body. The first switch 5 is closed when the film door or camera back 4 is closed, so that the contents in the counters 43 and 44 become zero.

When the first switch 5 is turned on, the output signal at the output terminal $b_1$ of the NOR gate 24 is at a low level. In response to this low level output signal, the counters 43 and 44 are set into the up-counting mode.

The first drive circuit 17 operates in the manner described in detail previously, so that the unexposed film 2 is wound on the take-up reel or spool 3. The outputs from the optical film detecting means; that is, the outputs from the light source 8 are applied through a NOR gate 51 to the counter 43. When the film 2 has been completely wound up, the number of frames is preset in response to the output signal from the buffer circuit 33 and is displayed by the display circuit 42. When the film has been wound up, the output signal of the NOR gate 24 rises high, so that the counters 43 and 44 are set to the down-counting mode. Upon completion of each exposure, the contents in the counter 43 is decreased by one in response to the output signal from the film feed detection circuit 40 in the second drive circuit 18, the output signal being applied through the OR gate 51.

When all the frames have been exposed, the contents in the counters 43 and 44 become zero, so that high-level signals are applied to the input terminals $i_2$ and $i_3$ of the AND gate 45. Then, the output signal at the output terminal $i_1$ of the AND gate 45; that is, the potential at the point K rises to a high level as shown at (k) in FIG. 6. The oscillator 46 is activated in response to this high level output signal so that the potential at the point L rises and drops as shown at (l) in FIG. 6 and consequently a transistor 50 is repeatedly turned on and off. As a result, the display unit 49 in the display circuit 42 twinkles, indicating that all the exposed film has been rewound into the film case or magazine 1.

From the above description it is apparent that the operations of the counter circuit 41 and the display circuit 42 are controlled in response to the variations in potential at suitable points in the first drive circuit 17 for automatically winding the unexposed film on the take-up reel or spool 3 and in the second drive circuit 18 for automatically rewinding stepwise the exposed film into the film case or magazine 1. It follows, therefore, that when one opens the film door or camera back 4 after having confirmed that the display unit 49 is twinkling, takes up the exposed film, loads a new film case or magazine and then closes the film door or camera back 4, the operations of the counter circuit 41 and the display circuit 42 are repeated again.

In the second embodiment, the automatic film winding operation is controlled by the first motor 11 and the optical film detection means and the automatic stepwise rewinding operation is controlled by the second motor 12 and the film feed detection circuit 40, but as in the case of the first embodiment the second embodiment may be so modified that both the automatic winding and rewinding operations may be carried out by one motor and one film detection circuit or means. That is, the output of the film feed detection circuit 40 is connected to the counter circuit 41 and is used to control not only the second motor 12 but also the first motor 11. Thus, the optical film detection means comprising the light emitting element 7, the light sensor 8 and the apertured disk 9 may be eliminated. Furthermore, as described previously, only one motor may be used which is drivingly connected to the take-up reel or spool 3 and the rewinding shaft through a train of intermediate gears, so that the take-up reel or spool 3 or the rewinding shaft may be selectively connected to the motor.

In summary, according to the second embodiment of the present invention, when a film case or magazine 1 is loaded into the camera body and the camera back 4 is closed, the film is automatically wound on the take-up reel or spool 3 and the number of frames of the film is counted and displayed. Everytime when one exposure is completed, the number of frames is decreased by one and so displayed. Thus, an operator needs not to count the number of remaining unexposed frames.

So far the second embodiment has been described in conjunction with the 35-mm film, it is to be understood that the present invention may be equally applied to any film with perforations such as 110-size films.

When the 35-mm film loaded in the film case or magazine is used, the film is once wound on the take-up reel or spool and then rewound stepwise after each exposure. As a result, even when one erratically opens the film door or camera back almost all the exposed frames have been already rewound in the film case or magazine which is light-shielded, so that the exposed frames can be prevented from being ruined or reexposed.

What is claimed is:

1. An automatic film transport device characterized by the provision of
   (a) a take-up reel for winding thereon a film unrolled from a film case loaded into a camera body,
   (b) a first drive means for rotating said take-up reel in one direction,
   (c) a film winding condition detection means for detecting the condition of the film being wound on said take-up reel which is driven by said first drive means,
   (d) a first drive control means which is adapted to activate said first drive means in response to the action of any suitable part of a camera accomplished prior to the first exposure of the film and deactivate said first drive means in response to the output from said winding condition detection means,
   (e) a second drive means for rewinding the film into said film case from said take-up reel,
   (f) a film detection means adapted to detect the length of the film rewound into said film case, and
   (g) a second drive control means which is adapted to activate said second drive means everytime when one exposure is completed after said first drive means has been deactivated and to deactivate said second drive means in response to the output from said second film detection means, thereby rewinding the film by a predetermined length.

2. An automatic film transport device as set forth in claim 1 further characterized in that
   said film winding condition detection means detects the rotation of said take-up reel and generates an output signal.

3. An automatic film transport device as set forth in claim 1 further characterized in that
   said film winding condition detection means detects the perforations of a film and generates an output signal.

4. An automatic film transport device as set forth in claim 1 further characterized in that
   said first drive means and said second drive means use a single prime mover.

5. An automatic film transport device as set forth in claim 1 further characterized in that
   said film winding condition detection means includes
   (a) a detection means for detecting the number of frames on the film wound on said take-up reel, and
   (b) a display means responsive to the output of said detection means for displaying the number of frames on the film,
   whereby in response to the output from said detection means said first drive means is controlled and the number of frames on the film is counted and said display means displays the number of frames to be exposed on the film after the film has been wound on said take-up reel.

6. An automatic film transport device characterized by the provision of
   (a) a take-up reel for winding thereon a film unrolled from a film case loaded into a camera body,
   (b) a first drive means for rotating said take-up reel in one direction,
   (c) a first detection means for detecting the number of exposable frames on the film wound on said take-up reel by said first drive means,
   (d) a frame number display means responsive to the output from said first detection means,
   (e) a first drive control means which is adapted to activate said first drive means in response to the action of any suitable part of a camera accomplished prior to the first exposure of the film and deactivate said first drive means in response to the output from said first detection means,
   (f) a second drive means for rewinding the film into said film case from the take-up reel,
   (g) a second detection means for detecting the length of the film rewound into said film case by said second drive means and generating an output signal in response to which said display means is controlled, and
   (h) a second drive control means which is adapted to activate said second drive means everytime when one exposure is completed after said first drive means has been deactivated and to deactivate said second drive means in response to the output from said second detection means,
   whereby prior to the first exposure the film in the film case is once wound on said take-up reel and the number of exposable frames on the film is displayed and everytime when the film is rewound by a predetermined length into said film case from said take-up reel, the number of exposable frames on the film is decreased by one so as to display the remaining number of exposable frames.

7. An automatic film transport device as set forth in claim 6 further characterized in that
   said first detection means detects the number of exposable frames on the film wound on said take-up reel in terms of the number of perforations counted.

8. An automatic film transport device as set forth in claim 6 further characterized in that
   said first and second drive means use a common prime mover.

* * * * *